US009163685B2

(12) United States Patent
Carmassi et al.

(10) Patent No.: US 9,163,685 B2
(45) Date of Patent: Oct. 20, 2015

(54) ROAD VEHICLE PROVIDED WITH A COOLING DUCT FOR THE COOLING OF A BRAKE

(71) Applicant: Ferrari S.p.A., Modena (IT)

(72) Inventors: Stefano Carmassi, Pisa (IT); Enrico Cardile, Modena (IT); Fabio Toni, Maranello (IT)

(73) Assignee: Ferrari S.p.A. (IT)

( * ) Notice: Subject to any disclaimer, the term of this patent is extended or adjusted under 35 U.S.C. 154(b) by 69 days.

(21) Appl. No.: 13/786,783

(22) Filed: Mar. 6, 2013

(65) Prior Publication Data
US 2013/0233658 A1     Sep. 12, 2013

(30) Foreign Application Priority Data

Mar. 6, 2012   (IT) .............................. BO2012A0108

(51) Int. Cl.
| *F16D 65/853* | (2006.01) |
| *B60T 5/00* | (2006.01) |
| *B62D 35/00* | (2006.01) |
| *F16D 65/847* | (2006.01) |
| *F16D 65/78* | (2006.01) |

(52) U.S. Cl.
CPC ................. *F16D 65/853* (2013.01); *B60T 5/00* (2013.01); *B62D 35/005* (2013.01); *F16D 65/847* (2013.01); *F16D 2065/783* (2013.01)

(58) Field of Classification Search
CPC ....... F16D 65/10; F16D 65/78; F16D 65/827; F16D 2065/1332; B60B 19/10; B60B 19/20; B60T 5/00; B60R 19/48; B60K 11/04; B62D 25/08

USPC ........... 188/264 A, 264 AA, 264 R; 296/208; 180/68.1, 68.2, 68.3; 165/44, 41, 165/104.19, 104.34

See application file for complete search history.

(56) References Cited

U.S. PATENT DOCUMENTS

| 4,810,021 A | 3/1989 | Burst |
| 5,322,340 A | 6/1994 | Sato et al. |
| 2004/0093969 A1* | 5/2004 | Nielsen ........................ 74/89.23 |

(Continued)

FOREIGN PATENT DOCUMENTS

| DE | 3813971 A1 | 11/1988 |
| DE | 3813972 A1 | 11/1988 |

(Continued)

OTHER PUBLICATIONS

"Italian Application Serial No. IT BO20120108, Search Report dated Nov. 20, 2012", 8 pgs.

*Primary Examiner* — Anna Momper
*Assistant Examiner* — San Aung
(74) *Attorney, Agent, or Firm* — Schwegman Lundberg & Woessner, P.A.

(57) ABSTRACT

A road vehicle provided with a cooling duct for the cooling of a brake, the cooling duct including an air intake arranged at the inlet of the cooling duct, a shutter, which is mobile, so as to move between a closing position, in which the shutter closes the air intake, and an opening position, in which the shutter leaves the air intake unobstructed, and an electric actuating device, which controls the movement of the shutter and, therefore, moves the shutter between the closing position and the opening position and is mechanically configured to be normally open and, therefore, in the absence of a power supply, to push the shutter towards the opening position.

15 Claims, 10 Drawing Sheets

(56) References Cited

U.S. PATENT DOCUMENTS

| | | | |
|---|---|---|---|
| 2006/0005658 A1* | 1/2006 | Armstrong et al. | 74/492 |
| 2006/0102399 A1* | 5/2006 | Guilfoyle et al. | 180/68.1 |
| 2008/0309120 A1* | 12/2008 | Kohlstrand et al. | 296/146.11 |
| 2010/0083918 A1* | 4/2010 | Tregnago et al. | 123/41.05 |
| 2010/0139429 A1* | 6/2010 | Ku | 74/89.37 |
| 2012/0022742 A1* | 1/2012 | Nemoto | 701/36 |
| 2012/0100790 A1* | 4/2012 | Miesterfeld et al. | 454/75 |
| 2012/0318476 A1* | 12/2012 | Begleiter et al. | 165/51 |

FOREIGN PATENT DOCUMENTS

| | | |
|---|---|---|
| DE | 3834119 A1 | 4/1990 |
| DE | 4317769 A1 | 1/1994 |
| DE | 4229945 A1 | 3/1994 |
| DE | 4243988 A1 | 6/1994 |
| DE | 102008019923 A1 | 10/2009 |
| EP | 0224654 A2 | 6/1987 |
| GB | 2269144 A | 2/1994 |
| GB | 2357477 A | 6/2001 |
| WO | WO-2005/102761 A1 | 11/2005 |

* cited by examiner

US 9,163,685 B2

ROAD VEHICLE PROVIDED WITH A COOLING DUCT FOR THE COOLING OF A BRAKE

PRIORITY CLAIM AND RELATED APPLICATIONS

This application claims the benefit of priority under 35 U.S.C. Section 119 to Italian Patent Application Serial No. B02012A 000108, filed on Mar. 6, 2012, which application is incorporated herein by reference in its entirety.

TECHNICAL FIELD

The present invention relates to a road vehicle provided with a cooling duct for the cooling of a brake.

BACKGROUND

During the step of braking, in the brakes of a road vehicle, the kinetic energy of the road vehicle is converted into heat, which is then disposed of into the external environment. It is important to prevent the temperature of the brakes from becoming too hot because an overheating of the brakes may lead to a corresponding overheating of the braking system actuating liquid, which can "boil" and therefore loose at least part of its hydraulic features; the overheating of the braking system actuating liquid is particularly negative because it determines a loss (which may be even very high) of the braking power which can be developed by the braking system, and thus determines a condition of extreme danger.

In a high-performance road, the brakes (and particularly, the front brakes) may require, in some operating situations (typically in the case of driving on a racing track), supplementary cooling to avoid overheating; such a supplementary cooling is guaranteed by specific cooling duct, which originate from air intakes obtained through the body (typically through the front fenders, in case of front brake cooling) and end near the brakes to convey the cooling air towards the brakes themselves.

However, it has been noted that the air intakes which feed the cooling ducts of the brakes determine a worsening of the aerodynamic penetration coefficient of the road vehicle, while the supplementary cooling of the brakes guaranteed by such air intakes is only necessary in particular conditions during the life of the vehicle, which are generally not very frequent. In order to solve this drawback, patent DE3834119A1 suggests to couple a shutter to each air intake of a cooling duct of a brake, which shutter is mobile so as to move between a closing position, in which the shutter closes the air intake and prevents the entrance of air into the cooling duct and thus improves the aerodynamic penetration of the road vehicle, and an opening position, in which the shutter leaves the air intake unobstructed and allows the entrance of air into the cooling duct. An actuating device controls the movement of the shutters which close the air intakes of the cooling ducts to keep the air intakes normally closed and open the air intakes only in case of actual need (i.e. during high intensity braking).

Similarly, patent application GB2269144A1, patent application DE4229945A1 and patent application DE42431288A1 describe a road vehicle provided with a cooling duct for cooling a brake and comprising: an air intake arranged at the inlet of the cooling duct; a shutter, which is mobile so as to move between a closing position and an opening position; and an actuating device, which controls the movement of the shutter and thus moves the shutter between the closing position and the opening position. The shutter is normally closed and therefore the actuating device must be actuated to move the shutter from the closing position to the opening position.

The solution introduced in patent applications DE3834119A1, GB2269144A1, DE4229945A1 and DE42431288A1 has some drawbacks, because it does not guarantee that the front brakes are always adequately cooled also in case of malfunctioning of the actuating device which controls the movement of the shutters which close the air intakes of the cooling ducts.

SUMMARY

Examples disclosed herein provide a road vehicle equipped with a cooling duct for the cooling of a brake, which road vehicle is free from the drawbacks described above and at the same time is easy and cost-effective to make.

According to some examples, a road vehicle equipped with a cooling duct for the cooling of a brake is provided as disclosed in the appended claims.

BRIEF DESCRIPTION OF THE DRAWINGS

The present invention will now be described with reference to the accompanying drawings, which show a non-limitative embodiment thereof, in which.

DETAILED DESCRIPTION

Figure 1:
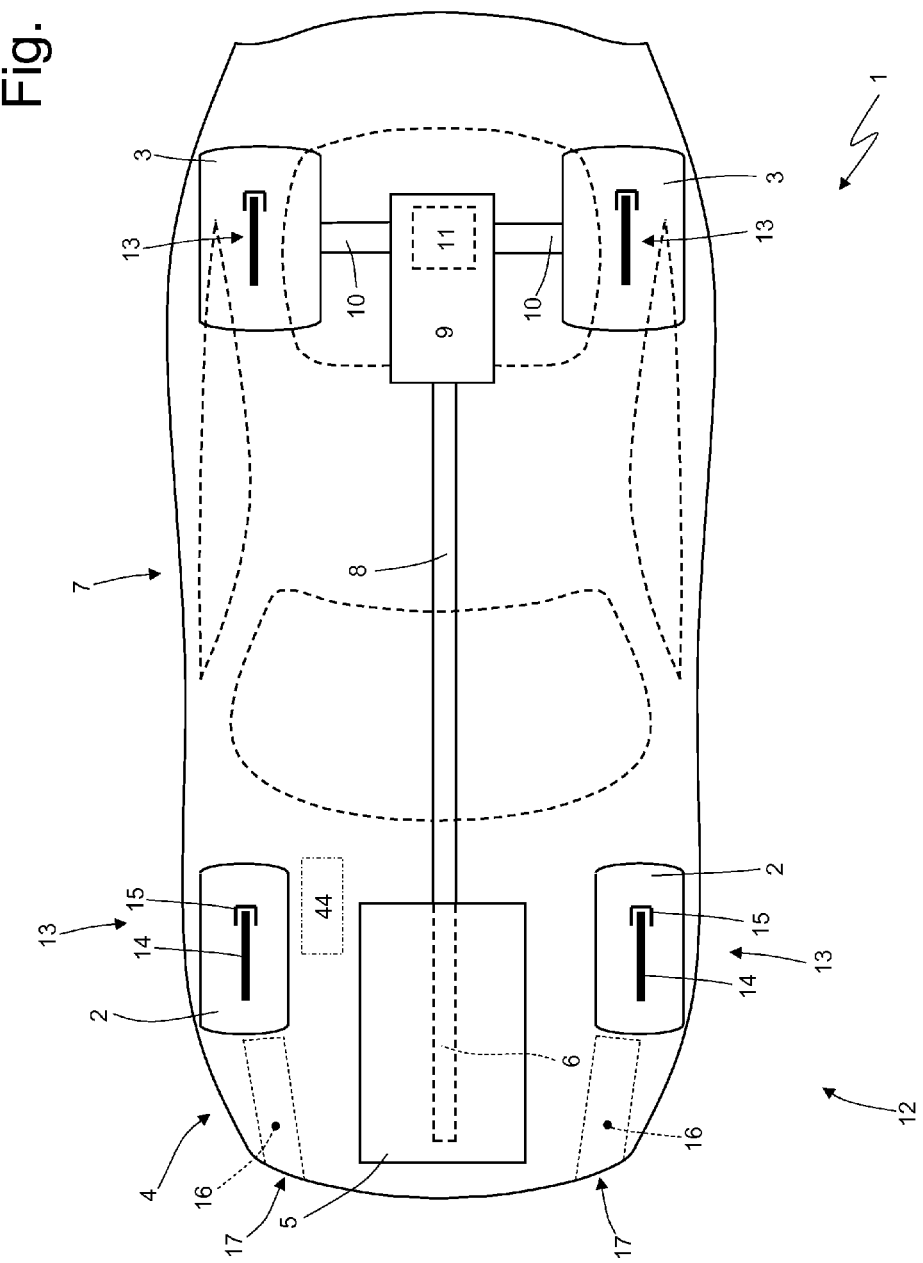
FIG. 1 is a diagrammatic, plan view of a road vehicle provided with two cooling ducts for the cooling of the front brakes.

In FIG. 1, numeral 1 indicates as a whole a road vehicle provided with two front wheels 2 and two rear drive wheels 3 which receive torque from a powertrain system 4.

The powertrain system 4 comprises an internal combustion thermal engine 5, which is arranged in front position and is provided with a drive shaft 6, and an automatic transmission 7, which transfers the torque generated by the internal combustion engine 5 to the rear drive wheels 3. The transmission 7 comprises a transmission shaft 8 which on one end is angularly integral with the drive shaft 6 and on the other end is mechanically connected to a double clutch gearbox 9 which is arranged in rear position and transmits motion to the rear drive wheels 3 by means of two axles shafts 10, which receive motion from a differential 11.

The road vehicle 1 comprises a braking system 12 having four brakes 13, each of which is arranged within a respective wheel 2 or 3 and is mechanically coupled to the wheel 2 or 3 itself. Each brake 13 comprises a brake disc 14 which is angularly integral with the wheel hub and a brake caliper 15 which envelops the brake disc 14 and is provided with a series of hydraulic pistons which are driven by means of a brake pedal arranged in a passenger compartment of the road vehicle 1.

The braking system 12 comprises two cooling ducts 16 which originate from corresponding air intakes 17 obtained through a front fender 18 (shown in FIGS. 2 and 3) of the road vehicle 1 and which end near the two front brakes 13 (i.e. the brakes 13 coupled to the two front wheels 2) to convey the cooling air towards the two front wheels 13. Obviously, the faster the running speed of the road vehicle 1, the higher the air flow which is channeled into the two cooling ducts 16 to be addressed towards the two front brakes 13.

Figure 2:
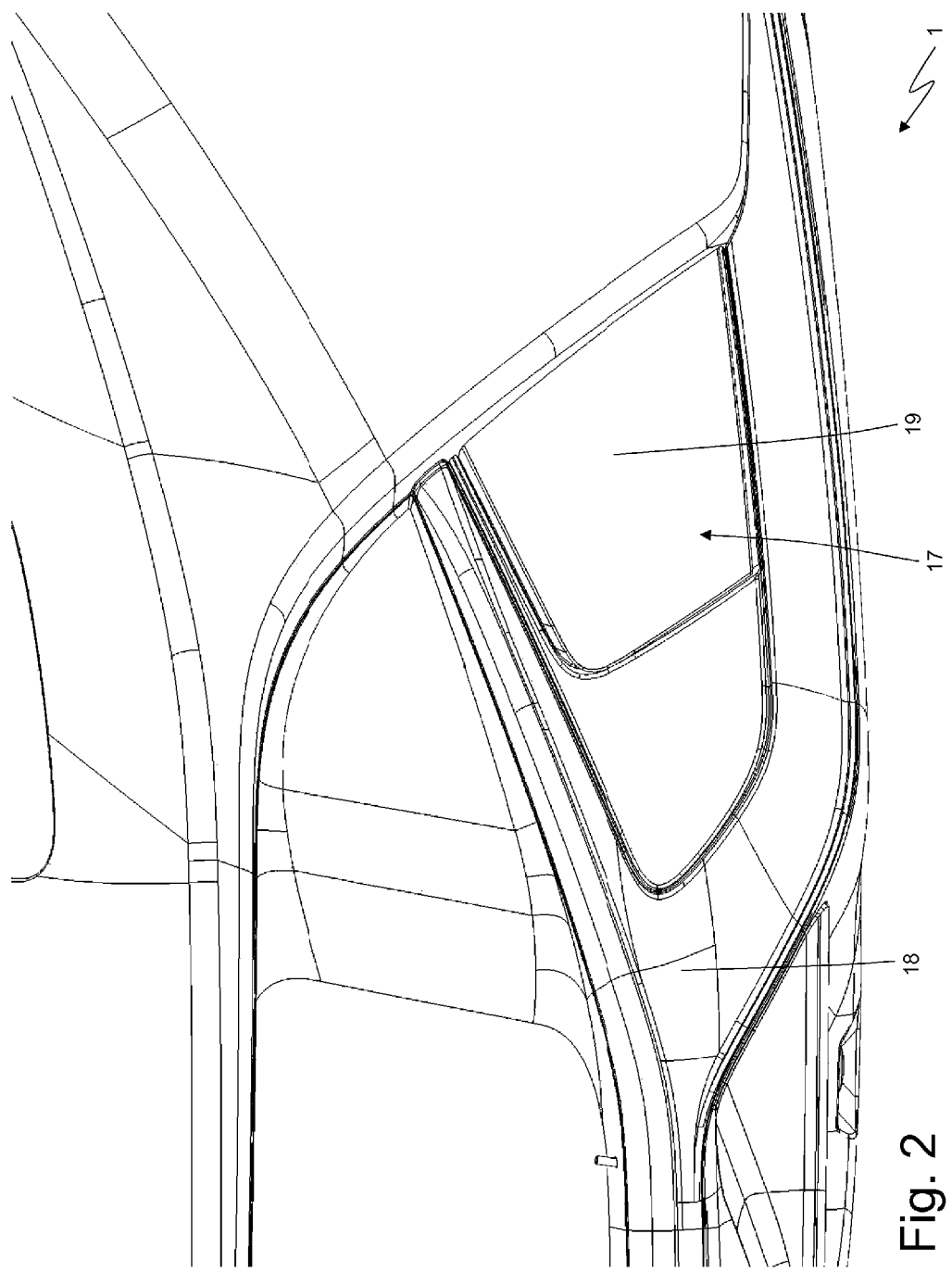
FIGS. 2 and 3 are two perspective views with parts removed for clarity of a left portion of a front fender of the road vehicle in FIG. 1 with an air intake of a cooling duct for the cooling of a front brake highlighted.
Figure 3:
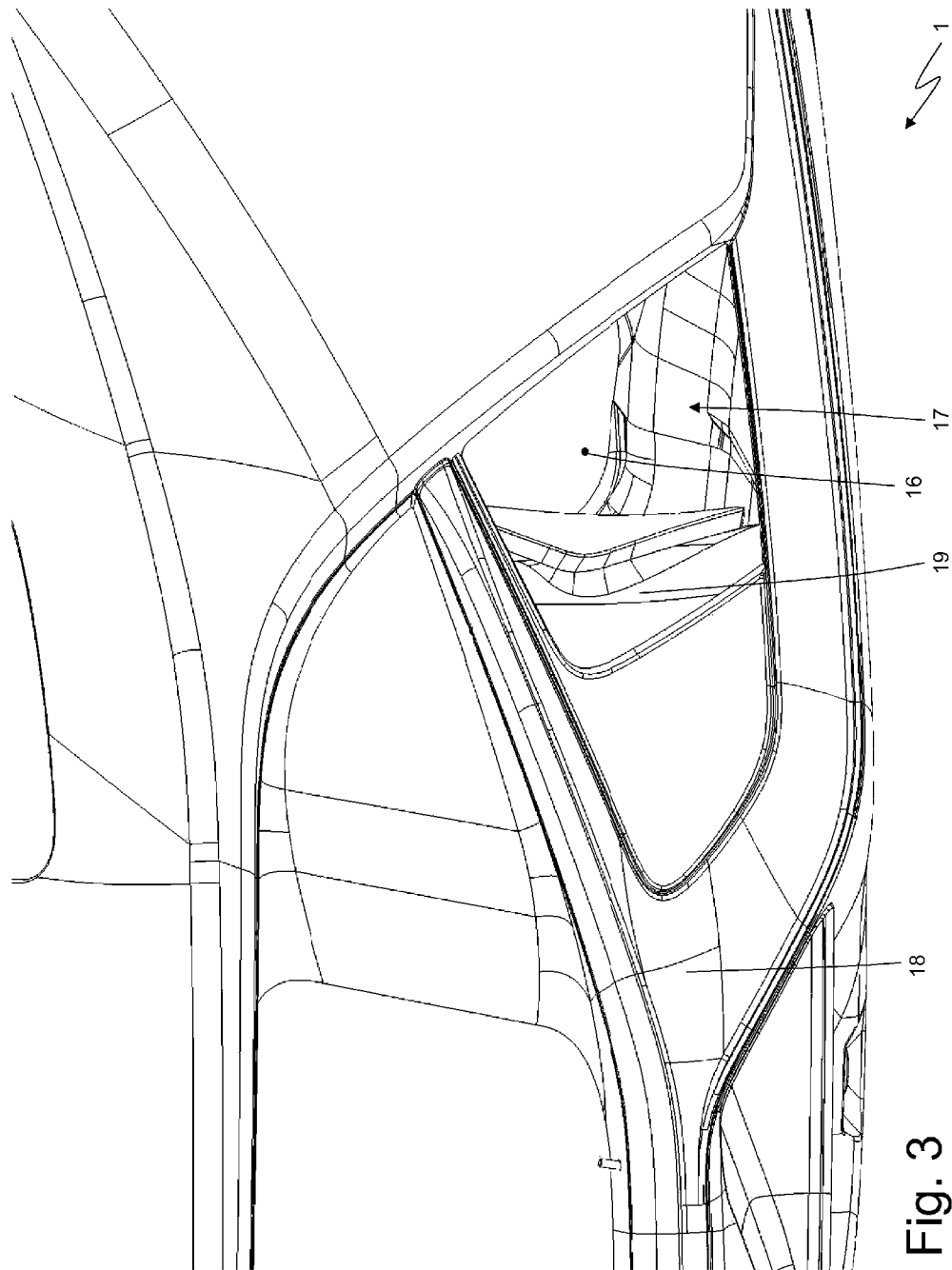

As shown in the FIGS. 2 and 3, each air intake 17 is provided with a shutter 19, which is rotationally fitted to move between a closing position (shown in FIG. 2), in which the shutter 19 closes (seals) the air intake 17 to prevent the entrance of air into the corresponding cooling duct 16 and to improve the aerodynamic penetration of the road vehicle 1 as a consequence, and an opening position (shown in FIG. 3), in which the shutter 19 leaves the air intake 17 unobstructed (open) to allow the entrance of air into the corresponding cooling duct 16.

Figure 4:
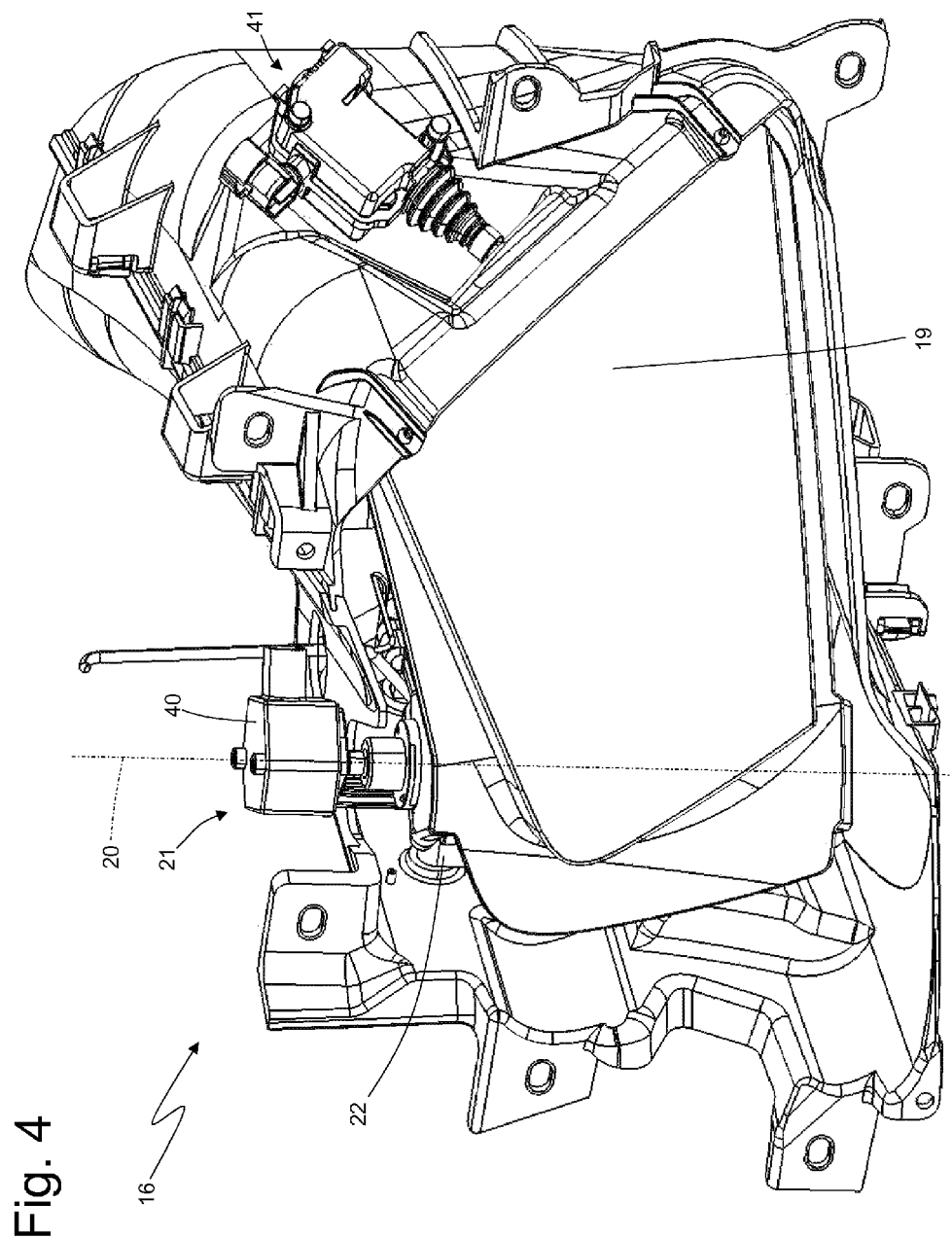
FIGS. 4 and 5 are two perspective views with parts removed for clarity of the cooling duct in FIGS. 2 and 3 with a shutter in a closing and in an opening position, respectively.
Figure 5:
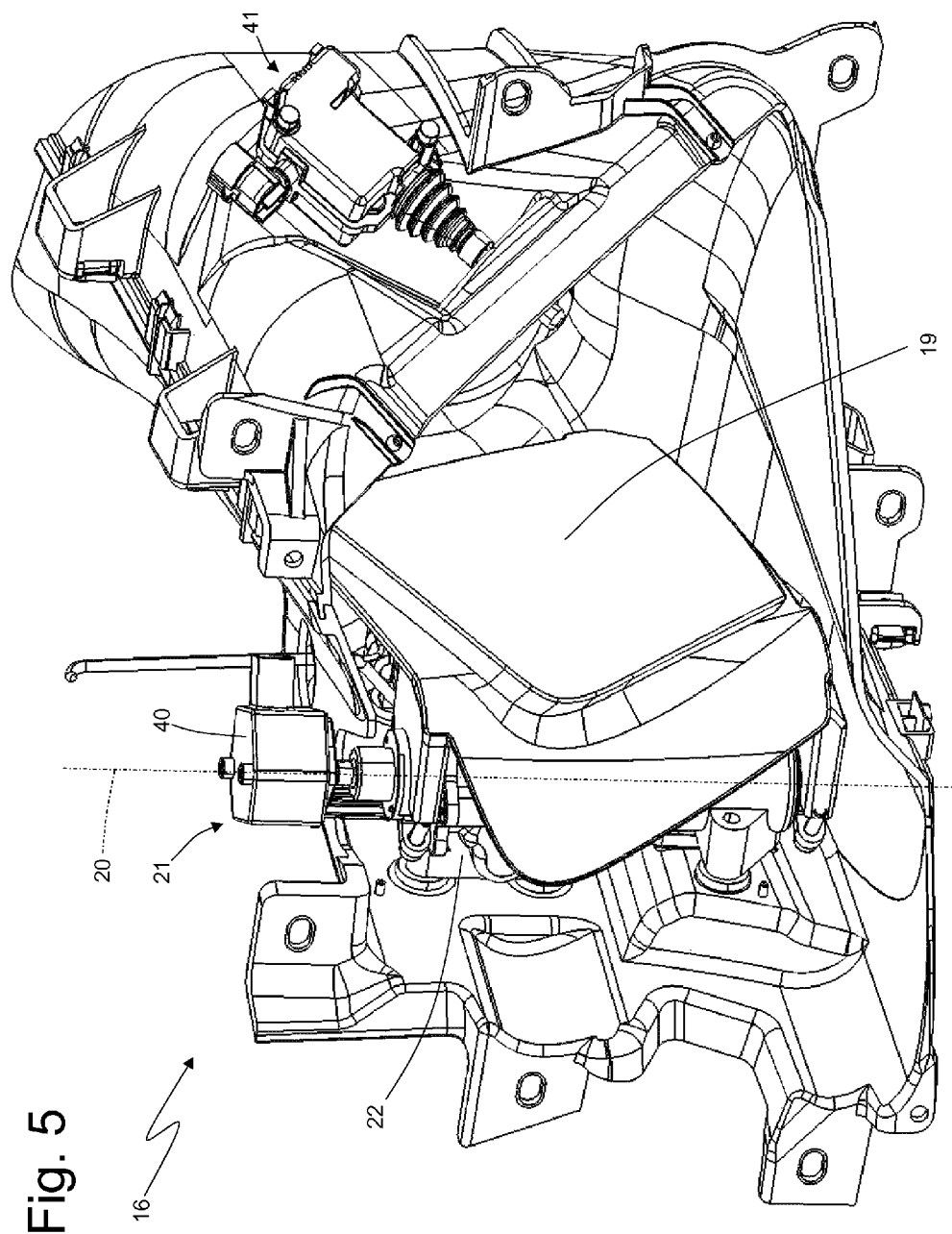
Figure 6:
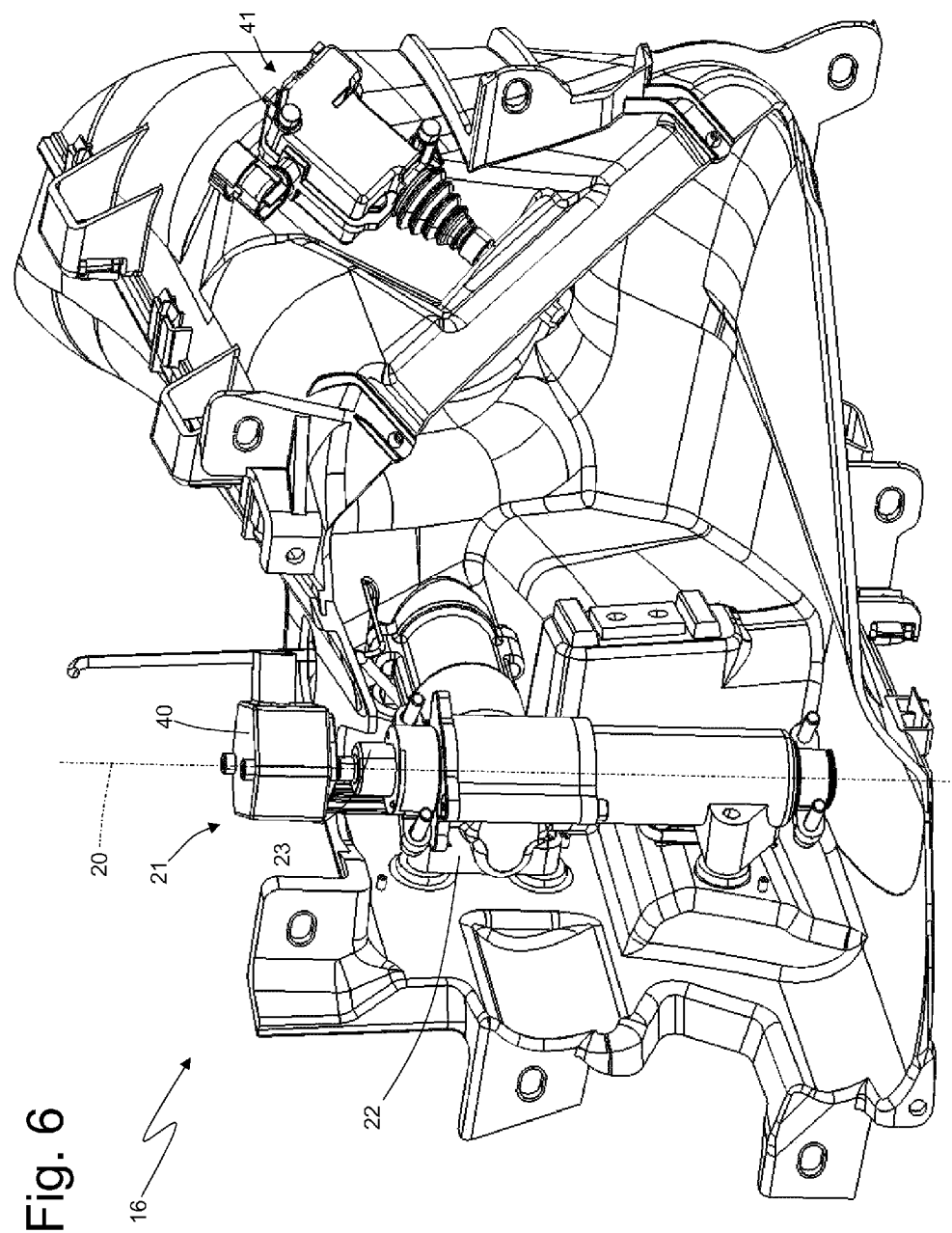
FIG. 6 is a perspective view with parts removed for clarity of the cooling duct in FIGS. 2 and 3 free from the shutter.

As shown in FIGS. 4, 5 and 6, each shutter 19 is rotationally fitted to turn about a rotation axis 20 between the closing position (shown in FIG. 4) and the opening position (shown in FIG. 5). The shutter 19 is mechanically fitted on an actuating device 21, which controls the rotation of the shutter 19 and therefore moves the shutter 19 between the closing position (shown in FIG. 4) and the opening position (shown in FIG. 5).

Each actuating device 21 comprises a support frame 22 which is rigidly constrained by means of screws to a wall of the cooling duct 16 and a main shaft 23 which is rotatory and mounted on the support frame 22 by means of a pair of ball bearings 24 (shown in FIG. 9) to rotate about the rotation axis 20. The shutter 19 is fitted onto the main shaft 23, which then directly supports the shutter 19 determining the rotation of the shutter 19 about the rotation axis 20.

Figure 7:
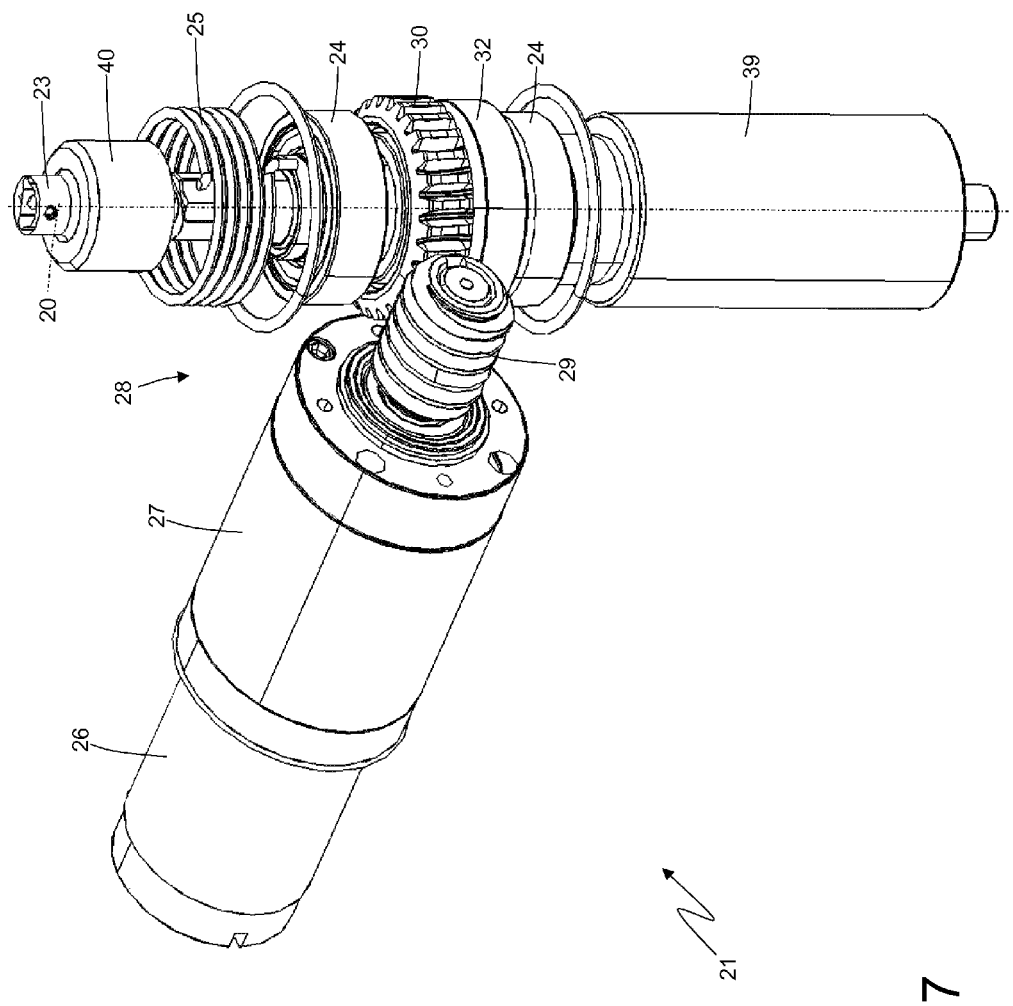
FIGS. 7 and 8 are two perspective views with parts removed for clarity of an actuating device of the shutter in FIGS. 4 and 5.
Figure 8:
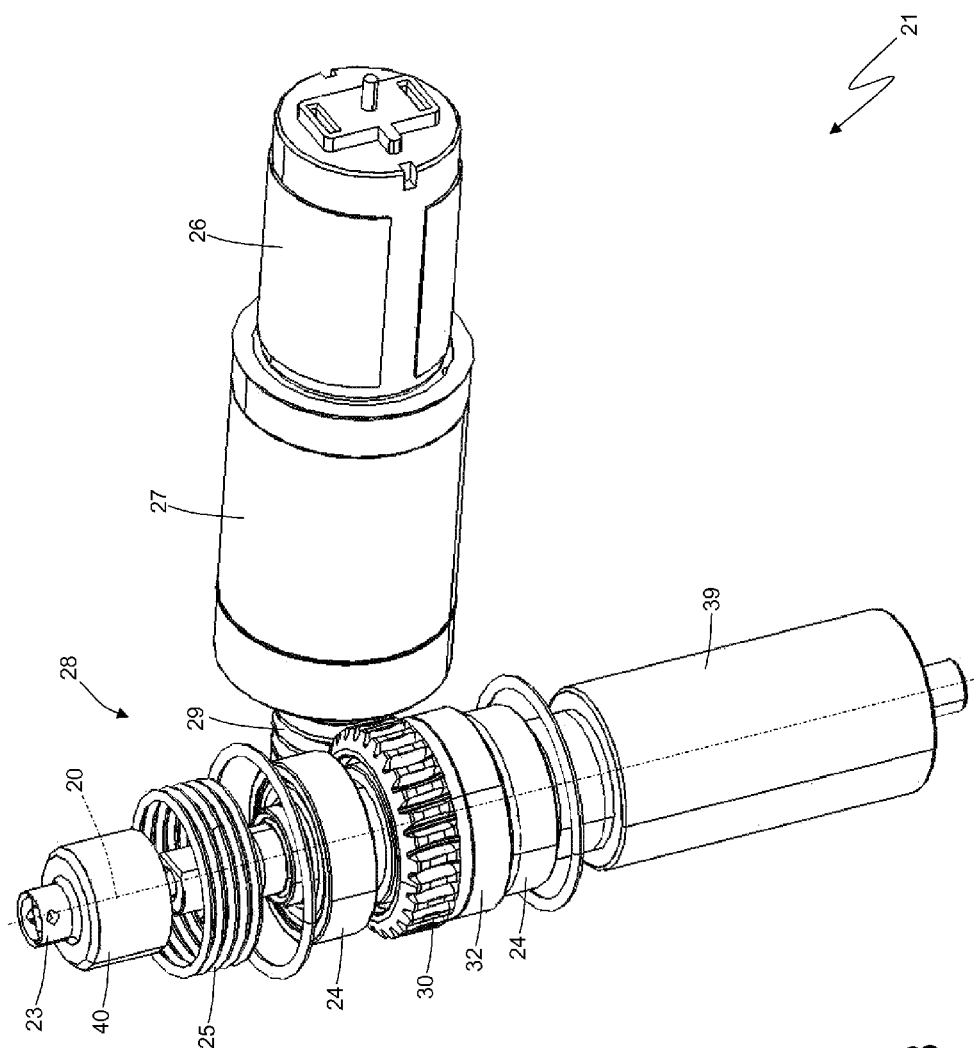
Figure 9:
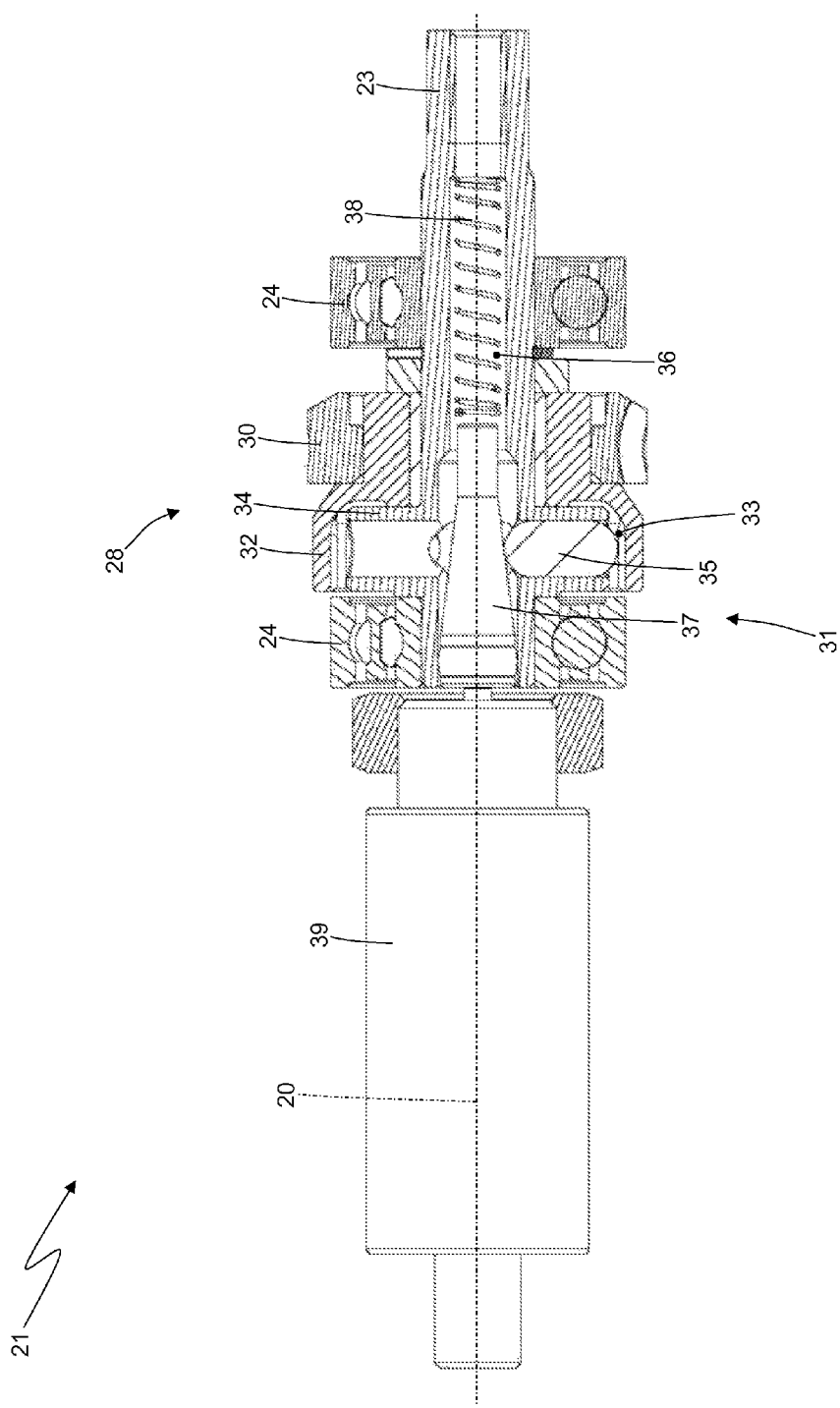
FIG. 9 is a longitudinal section view of the actuating device in FIGS. 7 and 8.

As shown in FIGS. 7, 8 and 9, each actuating device 21 comprises an elastic element 25 (in particular, a torsional screw), one end of which is fixed to the support frame 22 and the other end of which is fixed to the main shaft 23 to apply an opening torque of elastic origin to the main shaft 23, which pushes the main shaft 23 (and thus the shutter 19 integral with the main shaft 23) towards the opening position. Therefore, in the absence of other external interventions, the action of the elastic element 25 on the main shaft 23 (and thus on the shutter 19 integral with the main shaft 23) maintains the shutter 19 in the opening position.

Furthermore, each actuating device 21 comprising a direct current electric motor 26 directly coupled to a worm screw reduction gear 27, and a mechanical transmission 28, which transmits the rotatory motion of the reduction gear 27 to the main shaft 23 carrying the shutter 19. The mechanical transmission 28 comprises a worm screw 29, which is splined to the output shaft of the reduction gear 27, and a gear wheel 30, which is coaxial with the main shaft 23 and meshes with the worm screw 29; the worm screw 29 is arranged perpendicularly to the gear wheel 30 (and thus perpendicularly to the main shaft 23) and the meshing of the teeth of the worm screw 29 and the teeth of the gear wheel 30 are such as to determine an irreversibility of the motion. In other words, the geometry of the teeth of worm screw 29 and of gear wheel 30 allows a rotation of the worm screw 29 and of the gear wheel 30 in only one sense (corresponding to the sense of closing of the shutter 19 integral with the main shaft 23) and thus does not allow (locks) a rotation of the worm screw 29 and of the gear wheel 30 in the opposite sense (corresponding to the sense of opening of the shutter 19 integral with the main shaft 23).

Each mechanical transmission 28 is of the insertable type, i.e. is controllable to make the shaft of the reduction gear 27 angularly integral with the main shaft 23 carrying the shutter 19 (i.e. to transmit the motion from the shaft of the reduction gear 27 to the main shaft 23 carrying the shutter 19), or to make the shaft of the reduction gear 27 idle with respect to the main shaft 23 carrying the shutter 19. In particular, the mechanical transmission 28 comprises an engagement device 31, which can be activated to make the gear wheel 30 angularly integral with the main shaft 23 carrying the shutter 19, and can be deactivated to cause the gear wheel 30 to become idle with respect to the main shaft 23 carrying the shutter 19.

Each engagement device 31 comprises a bushing 32, which is mounted coaxial about the main shaft 23 and supports the gear wheel 30 (i.e. the gear wheel 30 is rigidly restrained to the bushing 32 and is splined about an upper portion of the bushing 32); there are a plurality of radial seats 33 (only one of which is visible in FIG. 9) inside the bushing 32, which seats are arranged radially and uniformly distributed about the rotation axis 20. Furthermore, each engagement device 31 comprises a pin-carrier disc 34 which is angularly integral with the main shaft 23 (e.g., is monolithic, i.e. made in one piece, with the main shaft 23, i.e. the pin-carrier disc consists of an "enlargement" of the main shaft 23), is arranged inside the bushing 32 at the radial seats 33, and accommodates a plurality of pins 35 (only one of which is shown in FIG. 9), each of which is adapted to radially slide (i.e. perpendicularly to the rotation axis 20) to get into/out of (i.e. to be engaged/released from) a corresponding radial seat 33.

The main shaft 23 (and thus the pin-carrier disc 34) is centrally perforated and thus centrally displays an axial seat 36 in which the control stud 37 is axially sliding, which stud has the shape of a truncated cone; and an axial spring 38 is arranged at the upper end of the axial seat 36, which spring is compressed between a wall of the axial seat 36 and an end of the control stud 37 and axially and constantly pushes the control stud 37 towards a releasing position. An electric linear actuator 39 is provided (typically provided with an electromagnet) on the opposite side of the axial spring 38, which actuator is mechanically coupled to the control stud 37 and can be activated in order to push the control stud 37 towards an engagement position against the elastic force generated by the axial spring 38 (i.e. by compressing the axial spring 38).

In use, when the linear actuator 39 is deactivated (off), the axial spring 38 maintains the control stud 37 in the releasing position, in which the control stud 37 does not radially push the pins 35 of the pin-carrier disc 34 radially outwards; consequently, the pins 35 do not remain inside the radial seats 33 and thus the pin-carrier disc 34 (i.e. the main shaft 23 which is angularly integral with the pin-carrier disc 34) is not restrained to the bushing 32 (i.e. to the gear wheel 30). Instead, when the linear actuator 39 is activated (on), the linear actuator 39 pushes (thus compressing the axial spring 38) the control stud 37 into the engaging position, in which the control stud 37 pushes the pins 35 of the pin-carrier disc 34 radially outwards; consequently, the pins 35 are forced to enter and remain inside the radial seats 33 and thus the pin-carrier disc 34 (i.e. the main shaft 23 which is angularly integral to the pin-carrier disc 34) is restrained (i.e. angularly integral) to the bushing 32 (i.e. to the gear wheel 30).

In various examples, each actuating device 21 comprises an angular position sensor 40, which is splined onto the main shaft 23 and detects the angular position of the main shaft 23 about the rotation axis 20 (i.e. detects whether the shutter 19 fitted on the main shaft 23 is in the opening position or in the closing position).

Figure 10:
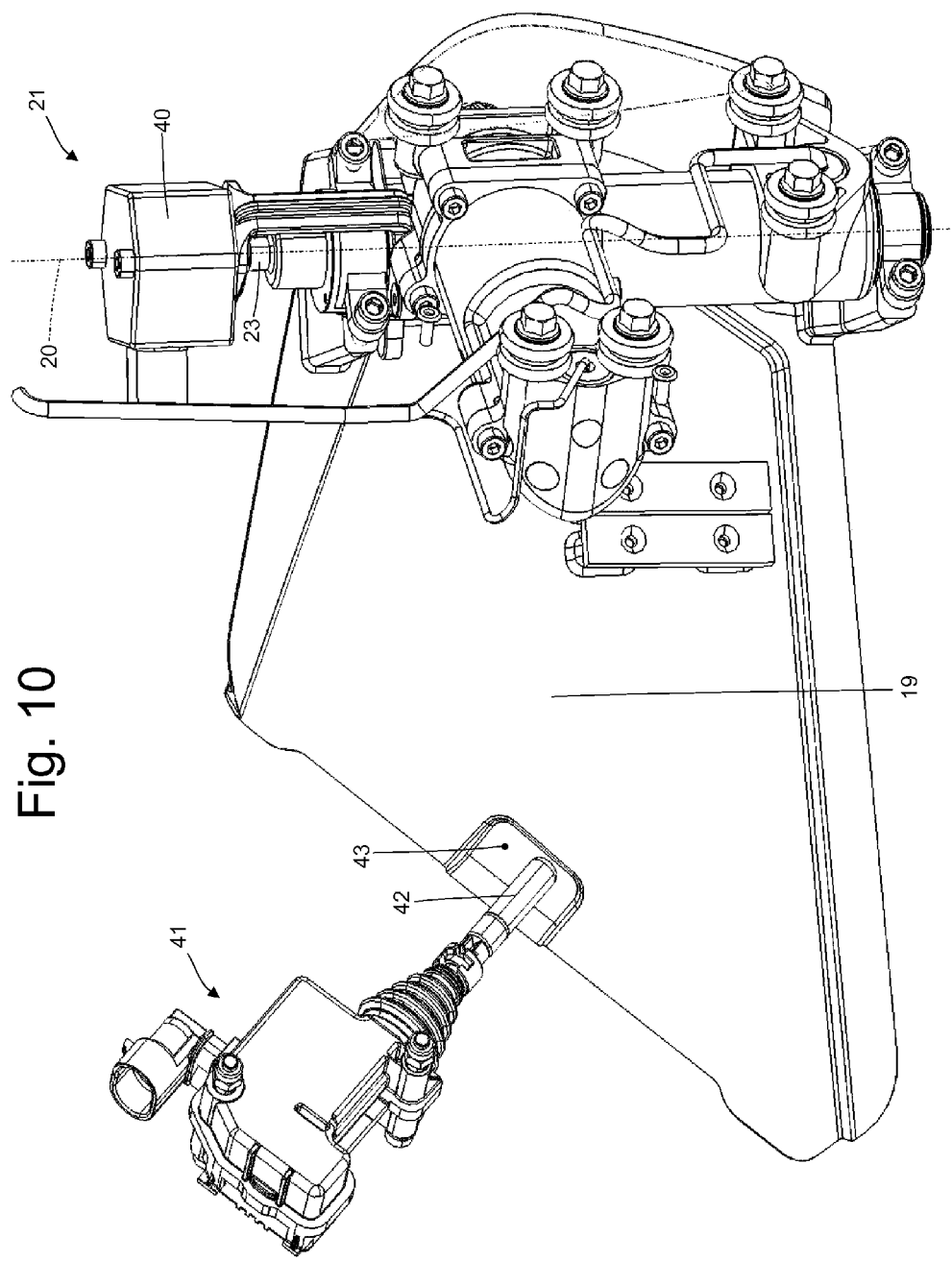
FIG. 10 is a further perspective view with parts removed for clarity of the cooling duct in FIGS. 2 and 3 with a locking device highlighted.

According to an embodiment shown in FIG. 10, a locking device 41 is provided for each shutter 19, which locking device is arranged near the shutter 19 on the opposite side with respect to the actuating device 21 and is adapted to maintain the shutter 19 in the closing position (as shown in FIG. 10) mechanically preventing the rotation of the shutter 19 from the closing position towards the opening position. The locking device 41 comprises a locking stud 42, which is axially actuated between an inactive position, in which the locking stud 42 does not interfere with the rotation of the shutter 19, and a locking position (shown in FIG. 10), wherein the locking stud 42 interferes with the rotation of the shutter 19 preventing the rotation of the shutter 19 from the closing position to the opening position as a consequence. The shutter 19 may be provided with a recess 43, in which the tip of the locking stud 42 is inserted in the locking position (shown in FIG. 10). The locking device 41 comprises a bistable mechanism, which mechanically maintains the locking stud 42 in the locking position or in the inactive position without needing to provide power and comprises an electric actuator which acts on the bistabile type mechanism to move the locking stud 42 from the locking position (shown in FIG. 10) from the inactive position and vice versa.

Finally, an electronic control unit 44 (diagrammatically shown in FIG. 1) is provided, which drives the electric motors 26, the electric linear actuators 39 and the locking devices 41 to control the movement of the shutters 19 as described below.

The operation of a shutter 19 coupled to an air intake 17 from which a cooling duct 16, which ends at a front brake 13, originates is described below.

When the road vehicle 1 is stopped and off (e.g., the ignition key is removed), the electric motor 26 and the electric linear actuator 39 are off (deactivated), and thus do not consume power, and the locking stud 42 of the locking device 41 is in the locking position (shown in FIG. 10) to maintain the shutter 19 in the closing position (mechanically preventing the rotation of the shutter 19 from the closing position to the opening position). As previously mentioned, the locking device 41 does not require power to keep the lock pin 42 in the locking position (shown in FIG. 10) and thus in this situation no power of any type is consumed (and thus the electric battery of the vehicle is not discharged in any manner).

When the road vehicle 1 is started, the control unit 44 drives the linear actuator 39 to move and maintain the control stud 37 in the engagement position, in which the main shaft 23 is made angularly integral with the output shaft of the gear reducer 27 through the mechanical transmission 28. Subsequently, the control unit 44 drives the locking device 41 to move the locking stud 42 from the locking position to the inactive position to allow the rotation of the shutter 19 about the main rotation axis 23. In these conditions, the main shaft 23 carrying the shutter 19 may only rotate towards the closing position because the rotation in opposite sense (i.e. towards the opening position) is locked by the irreversibility of the meshing of the teeth of the gear wheel 30 with the teeth of the worm screw 29. Consequently, the elastic force of the elastic element 25 and, if present, the aerodynamic pressure of the air on the shutter 19 are contrasted by the mechanical lock constituted by the irreversibility of the meshing of the teeth of the gear wheel 30 with the teeth of the worm screw 29 but not by a torque developed by the electric motor 26.

The shutter 19 remains in the closing position until the linear actuator 39 maintains the control stud 37 in the engaging position, i.e. until the main shaft 23 is angularly integral with the outlet shaft of the gear reducer 27 via the mechanical transmission 28. When the control unit 44 intends to move the shutter from the closing position to the opening position, the control unit 44 itself pushes the linear actuator 39, and thus the control stud 37 is pushed by the spring 38 into the engaging position; in this releasing position, the main shaft 23 is idle with respect to the outlet shaft of the gear reducer 27 and thus the torque applied to the main shaft 23 by the elastic element 25 and, if present, also the aerodynamic pressure of the air on the shutter 19, push the shutter 19 from the closing position to the opening position.

The shutter 19 remains in the opening position until the linear actuator 39 and the electric motor 26 are off. When the control unit 44 intends to push the shutter from the opening position to the closing position, the control unit 44 itself turns on the linear actuator 39 to move and maintain the control stud 37 in the engaging position, in which the main shaft 23 is made angularly integral with the outlet shaft of the gear reducer 27 by means of the mechanical transmission 28. Subsequently, the control unit 44 drives the electric motor 26 to apply a torque to the main shaft 23 carrying the shutter 19 which rotates the shutter 19 from the opening position to the closing position, overcoming the torque applied on the main shaft 23 by the elastic element 25 and, if present, also the aerodynamic pressure of the air on the shutter 19.

When the road vehicle 1 is turned off and before deactivating (removing power from) the linear actuator 39, the control unit 44 activates the locking device 41 to arrange the locking stud 42 in the locking position (shown in FIG. 10) so as to maintain the shutter 19 in the closing position (mechanically preventing the rotation of the shutter 19 from the closing position towards the opening position). As previously mentioned, the locking device 41 does not require power to keep the lock pin 42 in the locking position (shown in FIG. 10) and thus in this situation no power is consumed (and thus the electric battery of the vehicle is not discharged in any manner). In order to mitigate the negative effects of a fault of the locking device 41, the control unit 44 engages the lock only when the road vehicle 1 is off in order to confine the possible failure of the operation of the locking device 41 to steps in which forced brake cooling is not necessary.

The control unit 44 decides the position of the shutter 19 (i.e. to arrange the shutter 19 in the opening position or in the closing position) as a function of the temperature of the front brakes 13 (and in particular of the temperature of the brake discs 14 of the front brakes 13) and, according to an embodiment, also as a function of the running speed of the road vehicle 1.

When the temperature of the front brakes 13 (and in particular the temperature of the brake discs 14 of the front brakes 13) exceeds an upper temperature threshold, then the control unit 44 opens the shutter 19 (i.e. moves the shutter 19 from the opening position to the closing position), while when the temperature of the front brakes 13 (and in particular the temperature of the brake discs 14 of the front discs 13) drops under a lower temperature threshold, then the control unit 44 closes the shutter 19 (i.e. moves the shutter 19 from the closing position to the opening position). The two temperature thresholds are reciprocally different for creating a hysteresis range which avoids an excessively frequent actuation of the shutter 19. By way of example, the upper temperature threshold is equal to 250° C. and the lower temperature threshold is equal to 150° C.

Furthermore, regardless of the temperature of the front brakes 13 (and in particular of the temperature of the brake discs 14 of the front brakes 13), the control unit 44 never opens the shutter 19 if the running speed of the road vehicle 1 is lower than an upper speed threshold (e.g. equal to 80 km/h), because the air flow which is channeled into the cooling duct 16 is very low and thus substantially negligible (useless) under the upper speed threshold. Finally, regardless of the temperature of the front brakes 13 (and in particular of the temperature of the brake discs 14 of the front brakes 13), the control unit 44 always closes the shutter 19 if the running speed of the road vehicle 1 is lower than a lower speed threshold (e.g. equal to 30 km/h), because when the speed of the road vehicle 1 is very slow, stopping is likely and therefore the control unit prevents a movement of the shutter 19 occurring when the road vehicle 1 stops.

In brief, the control unit 44 opens the shutter 19 when the temperature of the front brakes 13 (and in particular the temperature of the brake discs 14 of the front brakes 13) is higher than the upper temperature threshold and the running speed of the road vehicle 1 is higher than the upper speed threshold at the same time. Furthermore, the control unit 44 closes the shutter 19 when the temperature of the front brakes 13 (and in particular the temperature of the brake discs 14 of the front brakes 13) is lower than the lower temperature threshold, the running speed of the road vehicle 1 is lower than the upper speed threshold.

According to an embodiment, the control unit 44 indirectly estimates the temperature of the brake discs 14 of the front brakes 13. Such an estimate includes calculating the kinetic energy differential of the road vehicle 1 induced by the deceleration at each deceleration of the road vehicle 1 determined by the actuation of the braking system 12; the estimate of the temperature reached by the brake discs 14 during deceleration is determined, by means of specific experimental maps, as a function of the kinetic energy differential and taking the starting temperature of the brake discs 14 before deceleration into account. According to an alternative embodiment, the control unit directly measures the temperature of at least one brake disc 14 of a front brake 13 by means of a temperature sensor (typically by means of an infrared temperature sensor which is pointed towards the brake disc 14 and which measures the temperature without contact).

According to an embodiment, the control unit 44 could maintain the shutter 19 in the opening position (providing that the running speed of the road vehicle 1 is higher than the lower speed threshold) when the driver selects a racing operating mode (i.e. for high-performance driving on a racing track), preferably by operating a selector arranged in the passenger compartment (the joystick).

The road vehicle 1 described above has many advantages.

Firstly, in the road vehicle 1 described above, the actuating devices 21 which control the movement of the shutters 19 are mechanically structured to be normally open, i.e. are naturally arranged in the opening position in the absence of the power. In this manner, the shutters 19 are always arranged in the opening position, which guarantees the maximum possible cooling of the front brakes 13 and thus the maximum safety situation in case of fault of the actuating device 21.

Furthermore, when the road vehicle 1 described above is parked, each shutter 19 is maintained in the closing position without consuming power (and thus without discharging the battery of the road vehicle 1); in this manner, foreign objects (unanimated or animated, such as insects in search of a nest) are prevented from entering more or less accidentally the cooling ducts 16, which could interfere with the later movement of the shutters 19.

Finally, in the road vehicle 1 described above, each actuating device 21 is particularly robust and reliable over time because the rotating electric motor is always used for short periods (i.e. only for moving the shutter 19 from the opening position to the closing position) and thus is off most of the time because the elastic force of the elastic element 25 and, if present, the aerodynamic pressure of the air on the shutter 19 are contrasted by the mechanical block constituted by the irreversibility of the meshing of the teeth of the gear wheel 30 and the teeth of the worm screw 29 but not by a torque developed by the electric motor 26. Only the linear actuator 39 remains active for very long times, but the linear actuator 39 does not have parts in constant movement (unlike the electric motor 26) and is based on an electromagnet which does not have any type of electric or mechanical wear even in case of continuous operation.

The invention claimed is:

1. A road vehicle provided with a cooling duct for the cooling of a brake, the cooling duct comprising:
    an air intake, which is arranged at the inlet of the cooling duct;
    a shutter, which is mobile, so as to move between a closing position, in which the shutter closes the air intake, and an opening position, in which the shutter leaves the air intake unobstructed;
    an electric actuating device, which controls the movement of the shutter and, therefore, moves the shutter between the closing position and the opening position, and is mechanically configured to be normally open such that the shutter is pushed toward the opening position in the absence of a power supply;
    a locking device independent of the actuating device and configured to be activated to mechanically prevent the shutter from moving from the closing position towards the opening position; and
    a control unit configured to activate the locking device to keep the shutter in the closing position when the road vehicle is turned off and deactivate the locking device to allow movement of the shutter when the road vehicle is turned off.

2. A road vehicle according to claim 1, wherein the locking device is arranged close to the shutter on the opposite side with respect to the actuating device and comprises a locking stud, which is axially moveable between an inactive position, in which the locking stud does not interfere with the movement of the shutter, and a locking position, in which the locking stud interferes with the movement of the shutter, thus consequently preventing the shutter from moving from the closing position towards the opening position.

3. A road vehicle according to claim 1, wherein the actuating device comprises:
    a main shaft, which is rotatory, so as to rotate around a rotation axis, to support the shutter;
    a support frame, which is rigidly constrained to a wall of the cooling duct, to support the main shaft in a rotatory manner; and
    an elastic element, which, at one end, is fixed to the support frame and, at the opposite end, is fixed to the main shaft, so as to apply to the main shaft an opening torque of elastic origin, to push the main shaft towards the opening position.

4. A road vehicle according to claim 3, wherein the actuating device comprises:
    a rotating electric motor, which is directly coupled to a reduction gear; and
    a mechanical transmission, which transmits the rotatory motion from the reduction gear to the main shaft carrying the shutter and comprises a worm screw, which is splined to the reduction gear, and a gear wheel, which is coaxial to the main shaft and meshes with the worm screw.

5. A road vehicle according to claim 4, wherein the meshing between the teeth of the worm screw and the teeth of the gear wheel is such as to determine an irreversibility of the motion, so as to prevent the worm screw and the gear wheel from rotating in the opening direction of the shutter integral to the main shaft.

6. A road vehicle according to claim 4, wherein the mechanical transmission comprises an engagement device, which can be activated to cause the gear wheel to become angularly integral to the main shaft carrying the shutter, and can be deactivated to cause the gear wheel to become idle with respect to the main shaft carrying the shutter.

7. A road vehicle according to claim 6, wherein the engagement device comprises:
 a bushing, which is mounted coaxial around the main shaft, supports the gear wheel, and is internally provided with a plurality of radial seats;
 a pin-carrier disc, which is angularly integral to the main shaft, is arranged inside the bushing in correspondence to the radial seats, and houses a plurality of pins, each of which is suited to radially slide, so as to get into/get out of a corresponding radial seat; and
 a control stud, which centrally presents the shape of a truncated cone, is inserted into a central hole of the pin-carrier disc, and is mounted so as to axially slide.

8. A road vehicle according to claim 7, wherein:
 the main shaft and the pin-carrier disc are centrally perforated and, therefore, centrally present an axial seat, into which the control stud is inserted in an axially sliding manner;
 an axial spring is arranged in correspondence to an upper end of the axial seat, said axial spring being compressed between a wall of the axial seat and an end of the control stud and constantly pushing the control stud towards a disengagement position; and
 an electric linear actuator is provided on the opposite side of the axial spring, said electric linear actuator being mechanically coupled to the control stud and being activated in order to push the control stud towards an engagement position against the elastic force generated by the axial spring.

9. A road vehicle according claim 1 and wherein the control unit configured to:
 determine a temperature of the brake;
 open the shutter, when the temperature of the brake exceeds an upper temperature threshold; and
 close the shutter, when the temperature of the brake falls below a lower temperature threshold.

10. A road vehicle according to claim 1 and wherein the control unit configured to:
 determine a temperature of the brake;
 determine a running speed of the road vehicle;
 open the shutter, when the temperature of the brake exceeds an upper temperature threshold and, at the same time, the running speed of the road vehicle exceeds an upper speed threshold; and
 close the shutter, when the temperature of the brake falls below a lower temperature threshold.

11. A road vehicle according to claim 1 and wherein the control unit configured to:
 determine a running speed of the road vehicle; and
 close the shutter irrespective of a temperature of the brake, when the running speed of the road vehicle falls below a lower speed threshold.

12. A road vehicle provided with a cooling duct for the cooling of a brake, the cooling duct comprising:
 an air intake, which is arranged at the inlet of the cooling duct;
 a shutter, which is mobile, so as to move between a closing position, in which the shutter closes the air intake, and an opening position, in which the shutter leaves the air intake unobstructed;
 an electric actuating device, which controls the movement of the shutter and, therefore, moves the shutter between the closing position and the opening position, and is mechanically configured to be normally open such that the shutter is pushed toward the opening position in the absence of a power supply; and
 a control unit configured to determine a running speed of the road vehicle and closing the shutter irrespective of a temperature of the brake when the running speed of the road vehicle falls below a lower speed threshold.

13. A road vehicle provided with a cooling duct for the cooling of a brake, the cooling duct comprising:
 an air intake, which is arranged at the inlet of the cooling duct;
 a shutter, which is mobile, so as to move between a closing position, in which the shutter closes the air intake, and an opening position, in which the shutter leaves the air intake unobstructed;
 an electric actuating device, which controls the movement of the shutter and, therefore, moves the shutter between the closing position and the opening position, and is mechanically configured to be normally open such that the shutter is pushed toward the opening position in the absence of a power supply, the actuating device comprises:
  a main shaft, which is rotatory, so as to rotate around a rotation axis, to support the shutter;
  a support frame, which is rigidly constrained to a wall of the cooling duct, to support the main shaft in a rotatory manner;
  an elastic element, which, at one end, is fixed to the support frame and, at the opposite end, is fixed to the main shaft, so as to apply to the main shaft an opening torque of elastic origin, to push to the main shaft towards the opening position;
  a rotating electric motor, which is directly coupled to a reduction gear; and
  a mechanical transmission, which transmits the rotatory motion from the reduction gear to the main shaft carrying the shutter and comprises a worm screw, which is splined to the reduction gear, and a gear wheel, which is coaxial to the main shaft and meshes with the worm screw, wherein the mechanical transmission comprises an engagement device, which can be activated to cause the gear wheel to become angularly integral to the main shaft carrying the shutter, and can be deactivated to cause the gear wheel to become idle with respect to the main shaft carrying the shutter, wherein the engagement device comprises: a bushing, which is mounted coaxial around the main shaft, supports the gear wheel, and is internally provided with a plurality of radial seats; a pin-carrier disc, which is angularly integral to the main shaft, is arranged inside the bushing in correspondence to the radial seats, and houses a plurality of pins, each of which is suited to radially slide, so as to get into/get out of a corresponding radial seat; and a control stud, which centrally presents the shape of a truncated cone, is inserted into a central hole of the pin-carrier disc, and is mounted so as to axially slide; and a locking device independent of the actuating device and configured to be activated to mechanically prevent the shutter from moving from the closing position towards the opening position.

14. A road vehicle according to claim 13, wherein the meshing between the teeth of the worm screw and the teeth of the gear wheel is such as to determine an irreversibility of the motion, so as to prevent the worm screw and the gear wheel from rotating in the opening direction of the shutter integral to the main shaft.

15. A road vehicle according to claim 13, wherein:
the main shaft and the pin-carrier disc are centrally perforated and, therefore, centrally present an axial seat, into which the control stud is inserted in an axially sliding manner;
an axial spring is arranged in correspondence to an upper end of the axial seat, said axial spring being compressed between a wall of the axial seat and an end of the control stud and constantly pushing the control stud towards a disengagement position; and
an electric linear actuator is provided on the opposite side of the axial spring, said electric linear actuator being mechanically coupled to the control stud and being activated in order to push the control stud towards an engagement position against the elastic force generated by the axial spring.

\* \* \* \* \*